US009046418B1

(12) United States Patent  (10) Patent No.: US 9,046,418 B1
Choi et al.  (45) Date of Patent: Jun. 2, 2015

(54) LINEAR FRESNEL SPECTROMETER CHIP WITH GRADIENT LINE GRATING

(71) Applicant: The United States of America as represented by the Administrator of the National Aeronautics and Space Administration, Washington, DC (US)

(72) Inventors: Sang Hyouk Choi, Poquoson, VA (US); Yeonjoon Park, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 163 days.

(21) Appl. No.: 13/775,809

(22) Filed: Feb. 25, 2013

Related U.S. Application Data

(60) Provisional application No. 61/602,719, filed on Feb. 24, 2012.

(51) Int. Cl.
*G01J 3/28* (2006.01)
*G01J 3/18* (2006.01)
*G02B 5/18* (2006.01)

(52) U.S. Cl.
CPC .................. *G01J 3/18* (2013.01); *G02B 5/1842* (2013.01); *G02B 5/1876* (2013.01)

(58) Field of Classification Search
CPC .... G02B 5/1876; G02B 5/1842; G02B 27/44; G01J 3/18; G01J 3/1804
USPC .................................................. 356/300–334
See application file for complete search history.

(56) References Cited

U.S. PATENT DOCUMENTS

| 5,020,910 | A | * | 6/1991 | Dunn et al. | 356/328 |
| 5,638,203 | A | * | 6/1997 | Hasegawa et al. | 349/139 |
| 5,731,874 | A | * | 3/1998 | Maluf | 356/326 |
| 6,870,619 | B1 | * | 3/2005 | Tenhunen et al. | 356/330 |
| 2004/0032585 | A1 | * | 2/2004 | Johansen et al. | 356/328 |

* cited by examiner

*Primary Examiner* — Kara E Geisel
*Assistant Examiner* — Hina F Ayub
(74) *Attorney, Agent, or Firm* — Jennifer L. Riley; Thomas K. McBride, Jr.

(57) ABSTRACT

A spectrometer that includes a grating that disperses light via Fresnel diffraction according to wavelength onto a sensing area that coincides with an optical axis plane of the grating. The sensing area detects the dispersed light and measures the light intensity associated with each wavelength of the light. Because the spectrometer utilizes Fresnel diffraction, it can be miniaturized and packaged as an integrated circuit.

20 Claims, 6 Drawing Sheets

LINEAR FRESNEL SPECTROMETER CHIP WITH GRADIENT LINE GRATING

CROSS-REFERENCE TO RELATED APPLICATIONS

The present application claims the benefit of U.S. Provisional Application No. 61/602,719 filed on Feb. 24, 2012, entitled "LINEAR FRESNEL SPECTROMETER CHIP WITH GRADIENT LINE GRATING", the entire contents of which are incorporated herein by reference.

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefore.

BACKGROUND OF THE INVENTION

Known spectrometers can be based on the Fraunhofer diffraction equation, which is valid at long optical distances. As a result, these spectrometers have size constraints that can render them unsuitable for use in a variety of small-scale applications and devices. Some spectrometers have been based on Fresnel diffraction, which is valid at much shorter distances relative to Fraunhofer diffraction. However, known spectrometers employing Fresnel diffraction can suffer from various drawbacks.

SUMMARY OF THE INVENTION

One aspect of the present invention is a spectrometer including a grating defining an optical axis plane. The grating receives incident light and causes Fresnel diffraction that disperses the incident light onto the optical axis plane according to the wavelength of the incident light. The spectrometer further includes a detector having a sensing area coinciding with the optical axis or optical axis plane. The detector detects a distribution of dispersed light on the sensing area and measures at least a selected one of light intensity and light wavelength of the dispersed light. The grating can comprise a half-linear grating having a base and a plurality of lines with gradually varying widths and gap distances, wherein each consecutive gradient line defines a ruling with the previous gradient line. The grating can be mounted to an integrated circuit, and the spectrometer can include a housing defining an interior space. The housing can include an opening through which light from outside the housing enters the interior space. The grating can comprise a transmissive grating, or it can comprise a reflection grating.

These and other features, advantages, and objects of the present invention will be further understood and appreciated by those skilled in the art by reference to the following specification, claims, and appended drawings.

DETAILED DESCRIPTION

Detailed embodiments of the present invention are disclosed herein. However, it is to be understood that the disclosed embodiments are merely exemplary of the invention that can be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
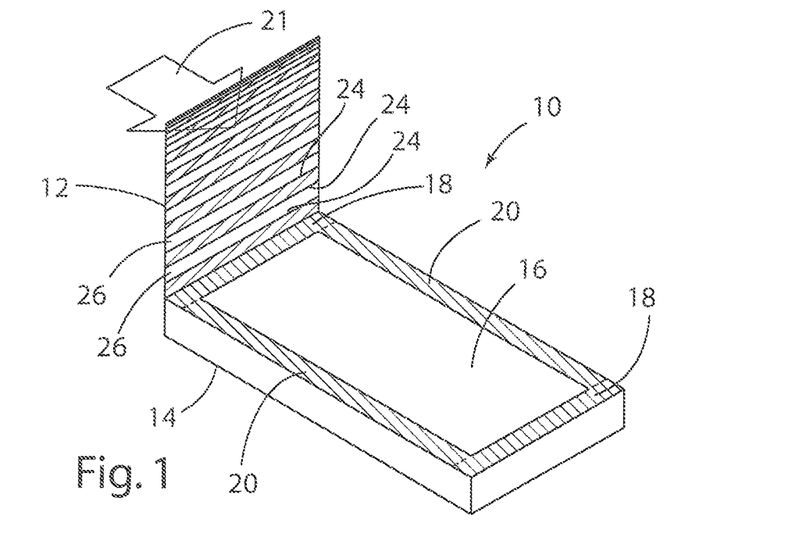
FIG. 1 is a partially schematic isometric view of a Fresnel spectrometer according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention can assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims.

Hence, specific dimensions and other physical characteristics relating to the embodiments disclosed herein are not to be considered as limiting, unless the claims expressly state otherwise.

Referring to FIG. 1, a Fresnel spectrometer 10 according to one aspect of the present invention includes a grating 12 mounted to a detector 14 having a sensing area 16. In the illustrated example, the grating 12 and sensing area 16 are generally planar. The grating 12 extends transversely relative to the sensing area 16 and defines an optical axis plane 18 having the same width as the grating 12 and a variable length. The optical axis plane 18 makes a right angle with the grating 12, and includes a dispersion area 20 that coincides with the sensing area 16. As will be shown in subsequent embodiments, the grating 12 is configured to provide Fresnel diffraction of incident light 21 by focusing dispersed light according to wavelength onto the sensing area 16 so thin the detector 14 can measure the wavelength and/or intensity of one or more distinct wavelengths without the need for moving parts. Thus, the present invention provides a solid-state spectrometer capable of being minimized by significantly reducing the optical path volume occupied by dispersed light compared to conventional spectrometers that typically rely on angular displacement via Fraunhofer diffraction.

Referring row to FIGS. 2A-2D, the grating 12 can have a linear configuration 12a, a half-linear 12b configuration, a circular configuration 12c, or a half-circular configuration 12d. Gratings 12a and 12b define optical axis planes 18a and 18b, respectively, and gratings 12c and 12d define optical axis 18c and 18d, respectively. A Fresnel spectrometer 10 according to the present embodiment can comprise a variety of grating configurations such as those illustrated in FIGS. 2a-2d, and the principles and equations described herein are equally applicable to any of the above-described configurations. However, in one embodiment, the half-linear configuration 12b is preferred to better illustrate the miniaturization capabilities of the Fresnel spectrometer 10 and because the linear configuration generally provides better resolution compared to the circular configuration.

Figure 2A:
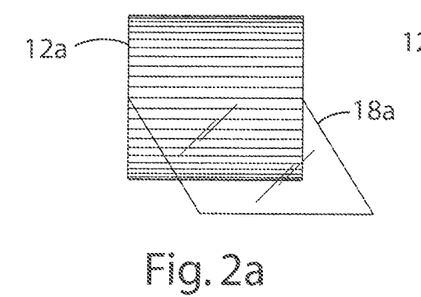
FIG. 2a is an isometric schematic view of a full linear gradient Fresnel grating according to one aspect of the present invention.
Figure 2B:
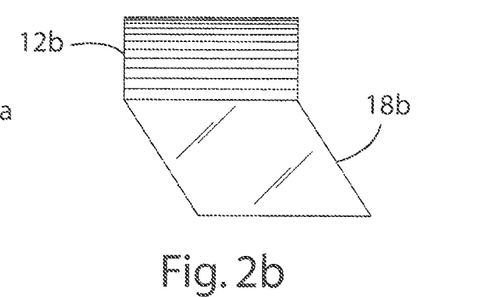
FIG. 2b is an isometric schematic view of a half linear gradient Fresnel grating according to one aspect of the present invention.
Figure 2C:
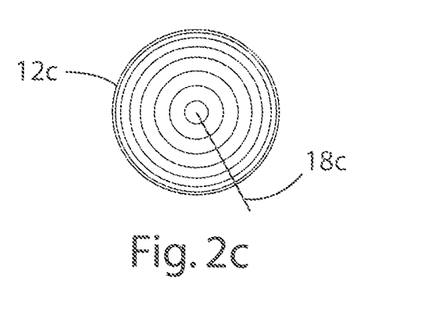
FIG. 2c is an isometric schematic view of a full circular gradient Fresnel grating according to one aspect of the present invention.
Figure 2D:
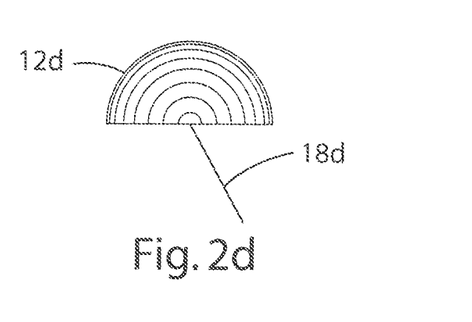
FIG. 2d is an isometric schematic view of a half circular gradient Fresnel grating according to one aspect of the present invention.
Figure 3:
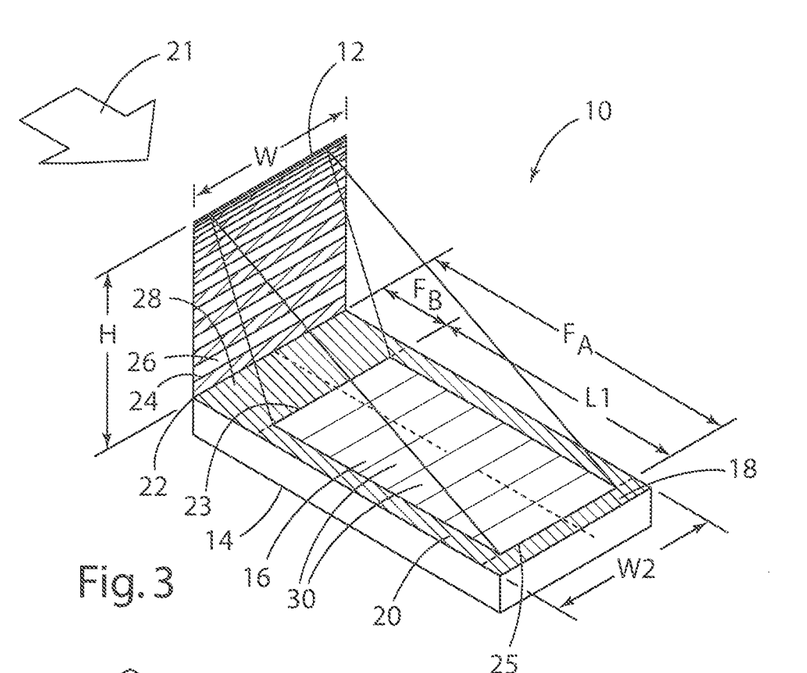
FIG. 3 is a partially schematic isometric view of a Fresnel spectrometer according to one aspect of the present invention.
Figure 4:
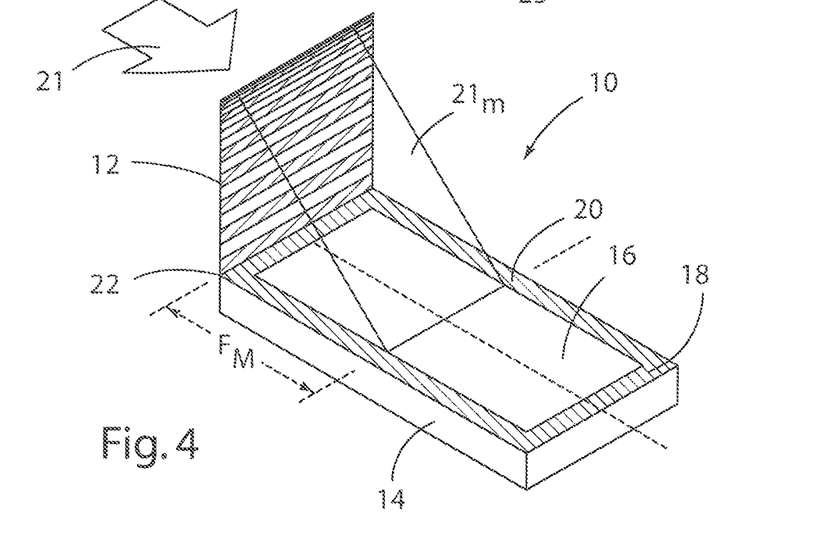
FIG. 4 is a partially schematic isometric view of a Fresnel spectrometer according to one aspect of the present invention.
Figure 5:
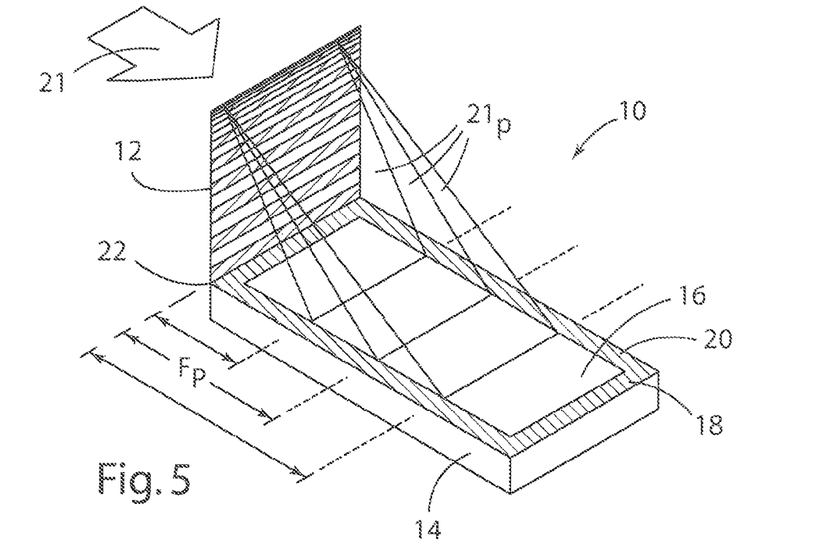
FIG. 5 is a partially schematic isometric view of a Fresnel spectrometer according to one aspect of the present invention.

Referring to FIG. 3, a Fresnel spectrometer 10 according to the present embodiment can include a half-linear grating 12 that is substantially similar to grating 12a (FIG. 2a). Grating 12 includes a base 22 and a plurality of parallel lines 24. The plurality of parallel lines 24 are disposed in a stacked configuration, wherein each line 24 and subsequent line 24 defines a ruling 26 that is parallel to the base 22 and transverse to the optical axis plane 18. The rulings 26 are configured to disperse incident light 21 onto the dispersion area 20 where it is distributed according to wavelength at a determinable focal point distance F relative to the grating 12. Therefore, dispersed monochromatic incident light $21_m$ is distributed on the dispersion area 20 at a single focal point distance $_{Fm}$ (FIG. 4) while dispersed polychromatic incident light $21_p$ is distributed on the dispersion area 20 at multiple focal point distances $F_p$ (FIG. 5) that each correspond to a distinct wavelength.

In order to construct the Fresnel spectrometer 10, parameters relating to the grating 12 and a wavelength spectrum must first be selected, which are likely to vary from one application to another. In the example illustrated in FIG. 3, Fresnel spectrometer 10 includes a square grating 12 with a height H of 500 micrometers and width W of 500 micrometers. Grating 12 has 156 lines for dispersing light made up of one or more wavelengths between boundary wavelength A and B of 200 and 1000 nanometers, respectively.

For exemplary purposes and in no particular order of importance, the dispersion area 20 for this grating 12 can first be determined by calculating the focal point distances $F_A$, and $F_B$ of the boundary wavelengths A and B with the focal point distance equation provided as follows:

$$f(\lambda) = \frac{R^2}{\lambda L} \quad (1)$$

where f(λ) is the focal point distance F of a wavelength relative to the base 22 of the grating 12, R is the height of the grating 12 if linear, or the radius if the grating 12 is circular, λ is the wavelength, and L is the number of lines in the grating 12 if linear, or the number of rings if the grating 12 is circular.

From equation 1, it becomes clear that the focal point distance F of a wavelength is directly proportional to height of the grating R and inversely proportional to wavelength λ and the number of lines L. In practice, it has been found that increasing the number of lines L typically improves the spectral resolution of the grating 12. Thus, if the size of the Fresnel spectrometer 10 is to be minimized, it is preferable to select a small R value and a large L value as doing so results in a smaller focal point distance F on the optical axis plane 18, thereby providing a dispersion area 20 that is closer to the grating 12. This also allows a smaller sensing area 16 to be employed to ensure a minimal optical path volume for the dispersed light. However, as will be obvious to those skilled in the art, the number of lines L will necessarily be limited by manufacturing technology and determined by the spectral demands of a particular application.

In the illustrated example (FIG. 3), the focal point distances $F_A$, and $F_B$ for the boundary wavelengths of 200 and 1000 nanometers, respectively, are calculated to be approximately 8000 micrometers and 1600 micrometers, each being rounded to one thousandth of a meter. By observing equation 1, it becomes evident that shorter wavelengths within the selected spectrum range are distributed on the optical axis plane 18 at greater distances from the base 22 of the grating 12 whereas longer wavelengths are distributed on the optical axis plane 18 at closer distances from the base 22 of the grating 12. Furthermore, another relationship can be discerned by observing the following energy equation:

$$E = \frac{hc}{\lambda}, \quad (2)$$

where E is the energy of a photon, h is Planck's constant, c is the speed of the incident light 21, and λ is the wavelength of the incident light 21.

From equation 2, it can be seen that shorter wavelengths will also have greater energy than longer wavelengths. Therefore, from equations 1 and 2, it can be seen that with respect to Fresnel diffraction, dispersed light will have a reciprocal distribution according to wavelength and a linear distribution according to energy.

Due to the reciprocal distribution of wavelengths, the dispersion area 20 for the selected spectrum is determined to be the region of the optical axis plane 18 bound by the focal point distances $F_A$ and $F_B$ of the shortest and longest wavelengths, respectively, of the selected spectrum. In the illustrated example, inner edge or boundary 23 of dispersion area 20 is located 1600 micrometers from the base 22 of the grating 12, and the outer edge or boundary 25 of dispersion area 20 is located 8000 micrometers from the base 22 of the grating 12. Thus, dispersion area 20 has a length L1 of 6400 micrometers and a width W2 that is congruent with the width of the optical axis plane 18. Therefore, the length of the dispersion area 20 corresponds to the minimum length of the sensing area 16 that will enable the detection of all wavelengths within the selected range, and the width of the dispersion area 20 corresponds to the maximum width W2 of the sensing area 16 that is capable of still detecting dispersed light for any given length. Thus, the dispersion area 20 defines the smallest area capable of detecting all dispersions for a selected wavelength range. Sensing area 16 can be configured to have substantially the same dimensions as the dispersion area 20, and the sensing area 16 and the dispersion area 20 can be positioned to coincide. As a result of the relative position of the dispersion area 20, a gap 28 separates the base 22 of the grating 12 from the edge 21 of dispersion area 20. In the illustrated example, gap 28 is 1600 micrometers.

Sensing area 16 can have the same width and length as the dispersion area 20 to minimize the size of the spectrometer 10. From this, it can be seen that the maximum optical path volume of dispersed light is 2 mm³, which corresponds to the area of the grating 12 multiplied by the focal point distance $F_A$ of the shorter boundary wavelength A.

To detect dispersed light, the sensing area 16 includes a plurality of detector pixels 30 in electrical communication with the detector 14. The detector pixels 30 are configured in an array to detect dispersed light on the sensing area 16, and the detector 14 subsequently measures the wavelength and/or intensity of the dispersed light. Each detector pixel 30 is disposed at an optical distance relative to the base 22 of the grating 12 and relies on the optical distance Z to perform a measurement. For a sensing area 16 having a total of detector pixels 30, the optical distance Z of each detector pixel 30 can be calculated using the following optical distance equation:

$$Z = g + (P_n P_p), \quad (3)$$

where Z is the optical distance relative to the grating 12, g is the gap distance, $P_n$ is the $N^{th}$ detector pixel number relative to the base 22 of the grating 12, and $P_p$ is the pixel pitch, a constant depending on the integrated circuit of the detector 14.

When a detector pixel 30 detects a photon of dispersed light, two measurements schemes can be used. For example, the wavelength of the photon can be measured using the following sensing area wavelength equation:

$$\lambda = \frac{R^2}{(LZ)}, \quad (4)$$

where λ is the wavelength, R is the height of the grating 12, L is the number of lines 24 of the grating 12, and Z is the optical distance of the detector pixel 30.

Alternatively, the detector pixel can measure the energy of the photon by using the following sensing area energy equation:

$$E = \frac{(hcLZ)}{R^2}, \quad (5)$$

where E is the energy of the photon, h is Planck's constant, c is the speed of the incident light 21, L is the number of lines 24 of the grating 12, Z is the optical distance of the detector pixel 30, and R is the height of the grating 12.

With respect to the Fresnel spectrometer 10, the simplest measurement scheme employs the energy equation to take advantage of the linearity of the energy scale. However, regardless of which measurement scheme is used, once one of the wavelength or energy is measured, the other is easily determined by rearranging (if needed) and solving equation 2 for the unknown variable. Once the detector pixels 30 have completed their measurements, a complete distribution of the dispersed light is obtained and the associated measurements can be outputted to external applications and devices for various use and data acquisition.

Having already determined the focal point distances F of the boundary wavelengths A and B, the position of each line 24 in the grating 12 can be calculated from the following line grating equation:

$$r(N,\lambda) = \sqrt{N} \cdot \sqrt{(\lambda - f(\lambda))}, \quad (6)$$

where r(N, λ) is the Nth line position relative to the base 22 of grating 12,
where N is the line number,
where λ is the wavelength, and
where f(λ) is the focal point distance F of the wavelength.

From equation 3, it becomes clear that each line position must be calculated separately. However, there is no need to perform the calculations with more than one wavelength and corresponding focal point distance F, since the calculated position of each line 24 will not vary per wavelength. Thus, equation 3 is not limited by wavelength range and r(N, λ) can be determined using any arbitrary wavelength. As a matter of convenience, the position of all 156 lines 24 with respect to the present embodiment can be calculated with either the 200 nanometer wavelength at the determined focal point distance of 8000 micrometers or the 1000 nanometer wavelength at the determined focal point distance of 1600 micrometers.

For example, the first line is from 0 to r(1, λ), and there is a gap from r(1, λ) to r(2, λ). The second line is from r(2, λ) to r(3, λ) and there is a gap from r(3, λ) to r(4, λ). The third line is from r(4, λ) to r(5, λ) and there is a gap from r(5, λ) to r(6, λ), and so on. With reference to the starting and ending positions, it is increasing in square root form. Therefore the width and the gap distance are actually decreasing as N increases.

Figure 6:
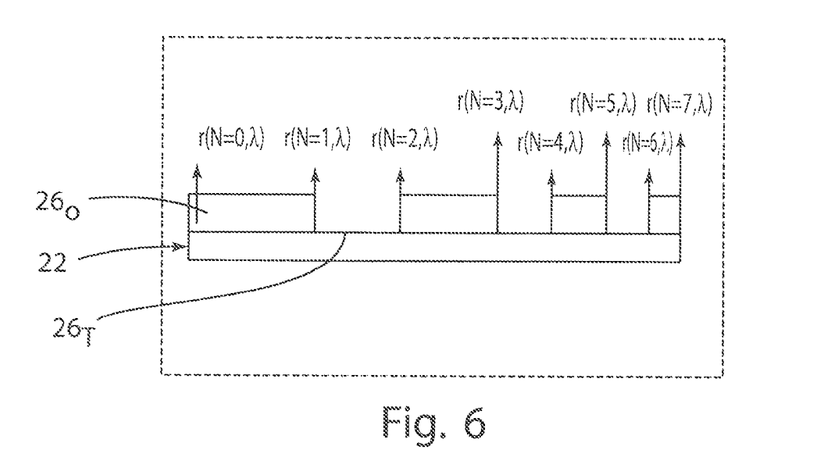
FIG. 6 is a schematic cross-sectional view of transmission type Fresnel grating.

With reference to FIG. 6, the grating 12 is shown having rulings 26 configured to provide transmissive and reflective gratings 12. In FIG. 6, transmissive grating 12 includes alternating opaque and transparent rulings $26_O$, $26_T$. In this embodiment, incident light 21 is dispersed through the transparent rulings 26 and the opaque rulings 26 can be configured to absorb incident light 21. In other embodiments, the opaque rulings can be substituted for refractive rulings 26 that are phase-shifted at 180 degrees with a controlled step height. Alternatively, in further embodiments, a reflective grating 12 can be employed having alternating absorptive and reflective rulings. Thus, depending on the type of grating 12 employed, the Fresnel spectrometer 10 can be configured to disperse incident light 21 being transmitted from a variety of directions onto the sensing area 16 for measurement.

Accordingly, the prior embodiment of the Fresnel spectrometer has provided one example of a miniaturized spectrometer having an optical path volume of 2 mm³ that is capable of detecting wavelengths within the range of about 200 to about 1000 nanometers. Given the miniaturization opportunities afforded by the Fresnel spectrometer 10, it is easily contemplated that the Fresnel spectrometer 10 will provide many uses in a wide variety of applications. For example, the Fresnel spectrometer 10 can be packaged as an integrated circuit, capable of being electrically coupled to the electrical systems of larger electrical devices. Thus, the ability to manufacture the Fresnel spectrometer 10 at a component level is one particular benefit offered by the Fresnel spectrometer 10 that is lacking in conventional spectrometers.

With further reference to FIGS. 7-12, Fresnel spectrometer 10 can be packed in several configurations designated 10A-10E. In FIGS. 7-12, Fresnel spectrometers 10A-10E are provided as integrated circuits 32A-32E. The Fresnel spectrometers 10A-10E include housings 34A-34F, respectively, that define interior spaces 36A-36E and openings 38A-38E through which light from outside the housings 34A-34E enters the interior spaces 36A-36E. The housings 34A-34E are configured to prevent light from entering except through the openings 38A-38E and can be constructed from an opaque material. The gratings 12A-12E and detectors 14A-14E are disposed within the interior spaces 36A-36E, wherein each grating 12A-12E includes a first side 40A-40E and a second side 42A-42E disposed opposite from one another.

Figure 7:
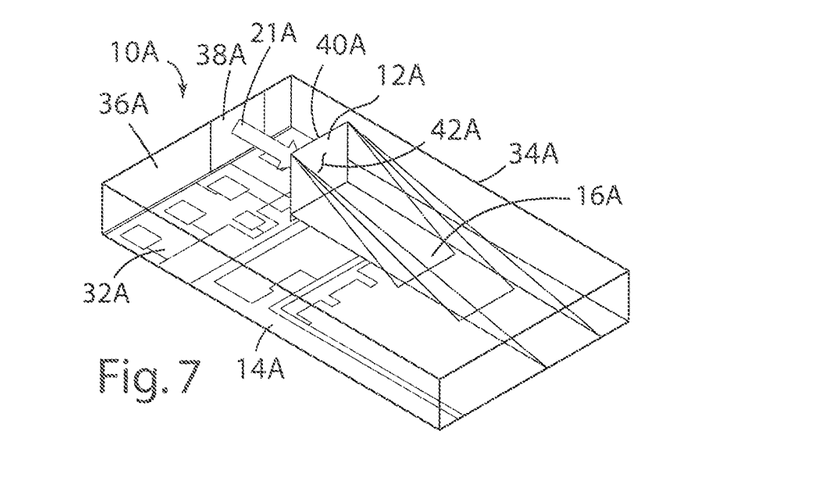
FIG. 7 is a partially schematic isometric view of a Fresnel spectrometer according to another aspect of the present invention.

With reference to FIG. 7, the opening 38A of Fresnel spectrometer 10A is disposed in a first position to face the first side 40A of the grating 12A. In the configuration of FIG. 7, the grating 12A is transmissive, such that at least a portion of the incident light 21A passes through the grating 12A and disperses onto the sensing area 16A of the detector 14.

Figure 8:
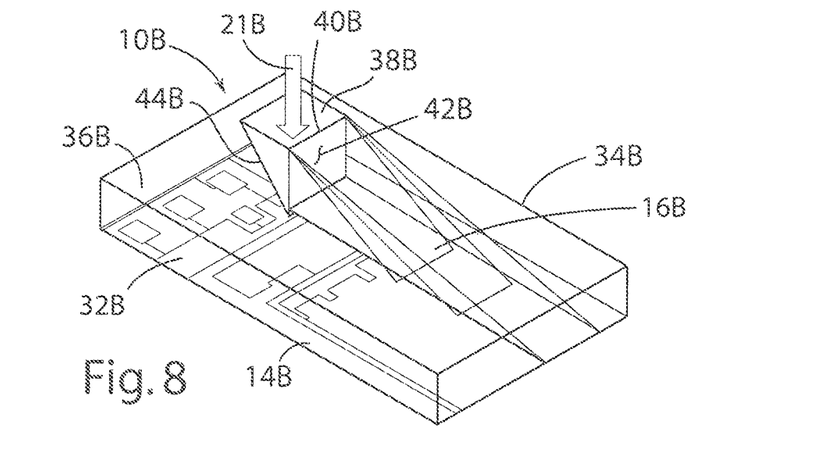
FIG. 8 is a partially schematic isometric view of a Fresnel spectrometer according to another aspect of the present invention.

With reference to FIG. 8, opening 38B of Fresnel spectrometer 10B is disposed in a second position and is in reflective communication with a first mirror 44 that is disposed adjacent to a first side 40B of grating 12B. Grating 12B is transmissive, and in reflective communication with the first mirror 44 such that incident light 21B enters through opening 38B and is reflected by the first mirror 44B towards the first side 40B of the grating 12B such that at least a portion of the incident light 21B passes through the grating 12B and disperses onto sensing area 16B of detector 14B.

Figure 9:
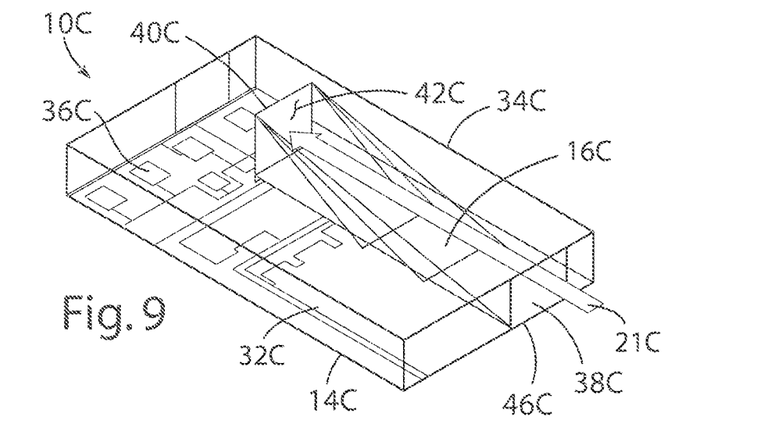
FIG. 9 is a partially schematic isometric view of a Fresnel spectrometer according to another aspect of the present invention.

With further reference to FIG. 9, opening 38C of Fresnel spectrometer 10C is disposed in a third position adjacent to a distal end 46 of sensing area 16C and facing second side 42C of grating 12C. In this configuration, incident light 21C entering opening 38C is transmitted in parallel with sensing area 16C towards second side 42C of grating 12C. Grating 12C comprises a reflective grating that reflects at least a portion of incident light 21C onto sensing area 16C.

Figure 10:
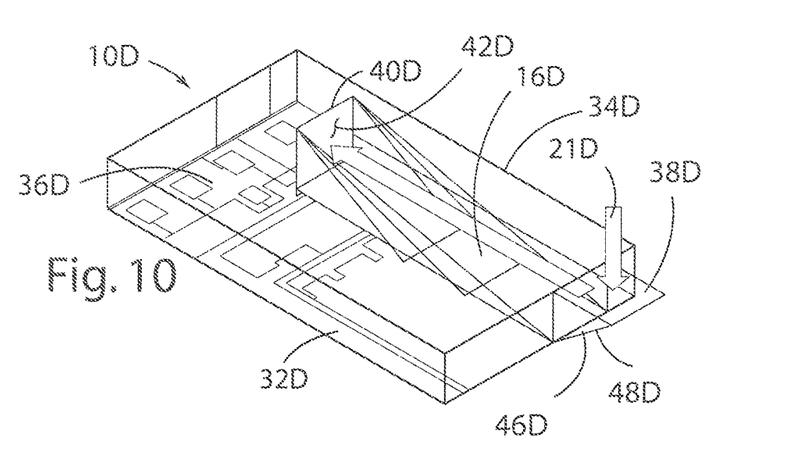
FIG. 10 is a partially schematic isometric view of a Fresnel spectrometer according to another aspect of the present invention.

With further reference to FIG. 10, opening 38D of Fresnel spectrometer 10C is disposed in a fourth position and is in reflective communication with a second mirror 48 that is adjacent to distal end 46 of sensing area 16D. In this configuration, incident light 21D entering opening 38D is reflected by the second mirror 48, and travels in parallel with sensing area 16D towards second side 42D of the grating 12D. The grating 12D comprises a reflective grating that reflects at least a portion of incident light 21D onto sensing area 16D.

Figure 11:
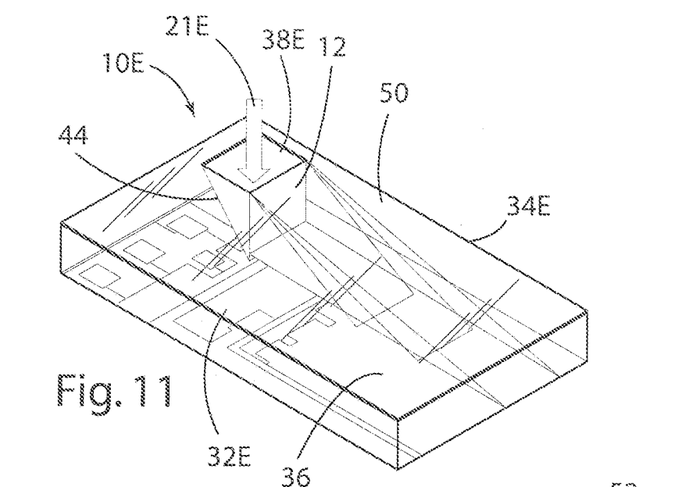
FIG. 11 is a partially schematic isometric view of a Fresnel spectrometer according to another aspect of the present invention.
Figure 12:
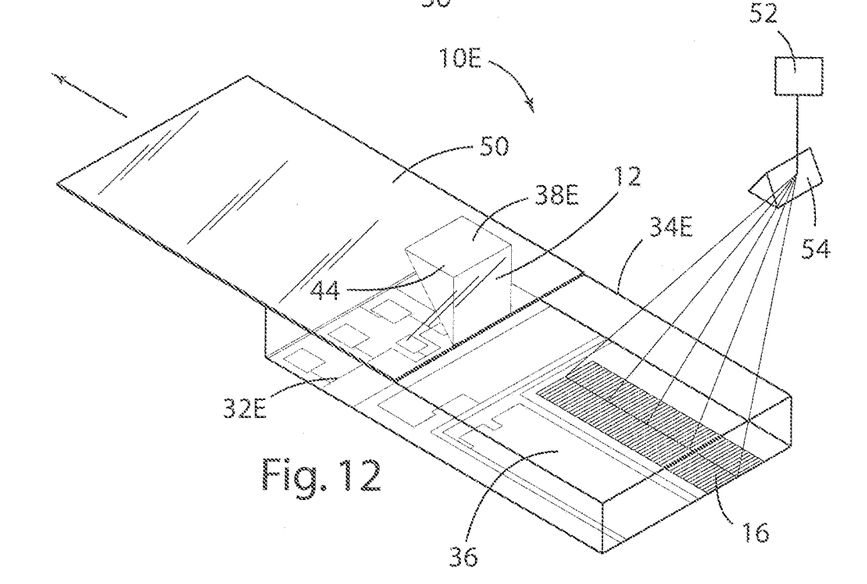
FIG. 12 is a partially schematic isometric view of the Fresnel spectrometer of FIG. 11 wherein the slidable cover is in a second position such that the sensing area can be utilized in connection with a Fraunhofer spectrometer.

With further reference to FIGS. 11-12, another packaging configuration 10E of the Fresnel spectrometer is similar to the configuration 10B of FIG. 8. Housing 34E of Fresnel spectrometer 10E further includes a movable member 50 that can be shifted between a first (open) position (FIG. 11) and a second (closed) position (FIG. 12) to selectively permit incident light 21E to enter the housing 34E and be dispersed by either Fresnel or Fraunhofer diffraction. When movable member 50 is in the first or open position of FIG. 11, incident light 21E enters housing 34E through opening 38E in the movable member 50. Light 21E is then reflected by the first mirror 44 such that at least a portion of the incident light 21E passes through the grating 12E and disperses onto the sensing area 16E. Movable member 50 can be shifted to the second or closed position (FIG. 12) to thereby prevent incident light 21E from reaching the grating 12E while simultaneously exposing the sensing area 16E. As a result, the sensing area 16E can be utilized to detect dispersed incident light from an external source such as dispersed light from a Fraunhofer spectrometer 52 employing a refractive device 54 such as, for example, a prism.

Accordingly, the present invention advantageously provides a Fresnel spectrometer 10 capable of detecting and measuring a wide range of wavelengths without the need for moving parts. The Fresnel spectrometer 10 can be miniaturized and can be packaged as a small integrated circuit for use with other applications and devices at a component level.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote arty order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment". "an embodiment", "some embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

It is to be understood that variations and modifications can be made on the aforementioned structures without departing from the concepts of the present invention, and further it is to be understood that such concepts are intended to be covered by the following claims unless these claims by their language expressly state otherwise.

The invention claimed is:

1. A solid state spectrometer, the solid state spectrometer comprising:
a single differential linear Fresnel grating defining one of an optical axis and an optical axis plane, wherein the grating receives incident light and causes Fresnel diffraction that disperses the incident light according to the wavelength of the incident light onto the optical axis or the optical axis plane;
a detector having a dispersion area and a sensing area coinciding with the optical axis or the optical axis plane, the detector detecting a distribution of dispersed light on the sensing area and measuring at least a selected one of light intensity and light wavelength of the dispersed light;

the detector is configured to measure the wavelength or intensity of one or more distinct wavelengths without having any moving parts; and the single differential linear Fresnel grating element is in a perpendicular configuration with the detector; wherein the single differential linear Fresnel grating is configured to provide the dispersion area of the detector with a minimal optical path volume for the dispersed light, such that the dispersion area defines the smallest area capable of detecting all dispersions for a wavelength range.

2. The spectrometer of claim 1, wherein the single differential linear Fresnel grating is operably coupled to the detector.

3. The spectrometer of claim 1, wherein the single differential linear Fresnel grating extends transversely to the sensing area.

4. The spectrometer of claim 1, wherein the distribution of the dispersed light on the sensing area is linearly proportional to a photon energy associated with a distinct wavelength and is reciprocally proportional to the distinct wavelength.

5. The spectrometer of claim 1, wherein the single differential linear Fresnel grating comprises a half-linear grating defining an optical axis plane, the grating having a base and a plurality of lines with gradually varying widths and gap distances, further wherein each consecutive gradient line defines a ruling with the previous gradient line.

6. The spectrometer of claim 5, wherein each differential line defines a differential line number with its line thickness and differential gap distances between lines; and the position of each differential line relative to the base satisfies the equation $r(N, \lambda) = \sqrt{(N)} \cdot \sqrt{(\lambda \cdot f(\lambda))}$, wherein N corresponds to the differential line number, $\lambda$ is selected from a range of wavelengths, and $f(\lambda)$ corresponds to the focal point distance of the selected wavelength and is given by the equation $f(\lambda) = R^2/(\lambda \square L)$, wherein R corresponds to the height of the single differential linear Fresnel grating, $\lambda$ is selected from a range of wavelengths, and L corresponds to the total number of differential lines.

7. The spectrometer of claim 6, wherein the single differential linear Fresnel grating comprises alternating opaque and transparent rulings.

8. The spectrometer of claim 6, wherein the single differential linear Fresnel grating comprises alternating absorptive and reflective rulings.

9. The spectrometer of claim 1, wherein the sensing area is substantially planar, and includes a plurality of detector pixels.

10. A spectrometer provided as an integrated circuit, the spectrometer comprising:

a single differential linear Fresnel grating defining an optical axis plane, wherein the grating is mounted to the integrated circuit and disperses incident light using Fresnel diffraction onto the optical axis plane according to at least one selected wavelength present in the incident light;

a detector having a dispersion area and a sensing area coinciding with the optical axis plane, the detector detecting a distribution of dispersed light on the sensing area and measuring at least a selected one of light intensity and light wavelength of the dispersed light;

the detector is configured to measure the wavelength or intensity of one or more distinct wavelengths without having any moving parts; and the single differential linear Fresnel grating element is in a perpendicular configuration with the detector; wherein the single differential linear Fresnel grating is configured to provide the dispersion area of the detector with a minimal optical path volume for the dispersed light, such that the dispersion area defines the smallest area capable of detecting all dispersions for a wavelength range.

11. The spectrometer of claim 10, wherein the spectrometer includes a housing defining an interior space and an opening through which light from outside the housing enters the interior space, and wherein the single differential linear Fresnel grating and the detector are disposed within the interior space;

the single differential linear Fresnel grating having a first side disposed opposite to a second side, wherein light is received on one of the first side and the second side.

12. The spectrometer of claim 11, wherein the single differential linear Fresnel grating comprises a transmissive grating with the first side disposed facing the opening such that at least a portion of the light passes through the transmissive grating and disperses onto the sensing area of the detector.

13. The spectrometer of claim 11, wherein the transmissive grating comprises a reflection grating with the second side facing the opening such that at least a portion of the light is reflected towards the sensing area of the detector and disperses onto the sensing area of the detector.

14. The spectrometer of claim 11, further comprising a mirror configured to reflect light onto the single differential linear Fresnel grating.

15. The spectrometer of claim 14, wherein the single differential linear Fresnel grating comprises a transmissive grating in reflective communication with the mirror; and wherein:

the mirror is disposed adjacent the first side of the transmissive grating and reflects incoming light traveling in a direction that is transverse to the optical axis plane onto the first side of the transmissive grating such that at least a portion of the light incident on the first side passes through the transmissive grating and disperses onto the sensing area of the detector.

16. The spectrometer of claim 14, wherein the single differential linear Fresnel grating comprises a reflective grating in reflective communication with the mirror; and wherein the mirror is disposed adjacent to a distal end of the sensing area and reflects incoming light traveling in a direction that is transverse to the optical axis plane onto the second side of the single differential linear Fresnel grating such that at least a portion of the light is reflected from the second side of the single differential linear Fresnel grating and disperses onto the sensing area of the detector.

17. The spectrometer of claim 10, further comprising a housing, and wherein the single differential linear Fresnel grating and the detector are disposed within the housing, the housing comprising an opening and a movable member, wherein the movable member can be shifted between an open position and a closed position to selectively permit light to enter the housing through the opening such that the light is dispersed by the single differential linear Fresnel grating.

18. The spectrometer of claim 17, wherein the sensing area is configured to detect dispersed light from a Fraunhofer spectrometer to determine at least one of the wavelength value and the energy value.

19. A method of using a Fresnel spectrometer to detect the intensity of light over a range of wavelengths, the method comprising
    providing a single differential linear Fresnel grating defining an optical axis plane;
    exposing the grating to incident light;
    causing Fresnel diffraction of the light utilizing the grating;
    causing the light to form a distribution of dispersed light according to the wavelength of the incident light onto the optical axis plane;
    providing a dispersion area and a sensing area that substantially coincide with the optical axis plane in a perpendicular fashion;
    detecting the distribution of dispersed light utilizing the sensing area;
    measuring at least one of a wavelength and an energy of the dispersed light; and
    measuring the wavelength or intensity of one or more, distinct wavelengths without the Fresnel spectrometer having any moving parts;
    wherein the single differential linear Fresnel grating is configured to provide the dispersion area of the detector with a minimal optical path volume for the dispersed light, such that the dispersion area defines the smallest area capable of detecting all dispersions for a wavelength range.

20. The method of claim 19, wherein the detector comprises an integrated circuit.

* * * * *